Patented Nov. 27, 1945

2,389,708

UNITED STATES PATENT OFFICE 2,389,708

COATING COMPOSITIONS

John J. Zolad, Detroit, Mich., assignor to E. I. du Pont de Nemours & Company, Wilmington, Del., a corporation of Delaware No Drawing. Application February 3, 1942, Serial No. 429,399

5 Claims. (Cl. 260—16)

This invention relates to protective and decorative coating compositions and more particularly to pigmented coating compositions which are used to fill in surface imperfections in an article to be coated.

In the art of covering an article with a protective and decorating coating composition, where the surface of the article does not possess adequate smoothness, and where the surface imperfections are of such a character that they cannot economically be filled with a primer, a surfacer, or a primer-surfacer, it is the practice to fill such surface imperfection with a highly pigmented coating composition commonly referred to as a glaze or a putty. It has heretofore been necessary to allow such glazes or putties to attain all, or a substantial part, of their ultimate hardness before sanding them, and then to apply either a surfacer or a sealer coat which is dried or baked and which may or may not be sanded, and finally to apply the topcoat. All or most of these steps, depending on the quality of the finish desired, are a necessary part of the procedure for reasons well known to those familiar with the art.

This invention has as an object a finishing system which will permit the application of a baking topcoat immediately after the application of the surfacing composition and then baking the two together.

A further object is that under the above conditions of application, the surfacing composition will bake out hard.

A still further object is that under the above conditions of application, the surfacing composition will retain its original shape and volume, that is, it will not swell, shrink, or crack.

Another object is the provision of a surfacing composition that will not discolor the topcoat when baked.

Also another object is a coating system in which the surfacing composition will not diminish the gloss of the topcoat.

Still another object is the provision of a surfacing composition which may be used in the conventional manner, that is, it may be baked separately if so desired.

Other objects will appear hereinafter as the description of the invention proceeds.

These objects are accomplished by the incorporation of solid granular ethyl cellulose into a coating composition in which the ethyl cellulose is, for all practical purposes, insoluble at normal temperatures. Under the specified conditions of use of the said surfacing composition, the temperature will be raised high enough and maintained long enough to cause fusion of the ethyl cellulose particles and partial solubility in the remainder of the surfacing composition. The invention will be more readily understood from the following description.

To secure the full benefit from the use of solid granular ethyl cellulose, I have found that it is necessary that the ethyl cellulose be, for all practical purposes, insoluble in the liquid vehicle at normal temperatures. The conditions of use of this type of ethyl cellulose coating composition should be such that the temperature of the composition is raised high enough and maintained long enough to permit the ethyl cellulose particles to fuse together and also to dissolve partly in the liquid vehicle used. The temperature must be above about 275° F. and preferably below about 350° F.

An ethyl cellulose suitable for use in the above prescribed manner must possess an ethoxy content in the range of 46.8 to 48.5 per cent. The viscosity of the ethyl cellulose, as determined at 25° C. on a 5 per cent concentration in a solvent composed of 80 parts toluene and 20 parts denatured ethyl alcohol (by weight), may vary within wide limits, suitable viscosities having been found to range from 7 to 100 centipoises. The ethyl cellulose should be present in amount between 6 per cent and 10 per cent of the total composition. A considerable departure from this range is unsatisfactory. The particle size and the particle size distribution may vary within wide limits too, provided, however, that the particle size distribution is not so fine that all of the material will pass through an 80 mesh screen. The ethyl cellulose should, for all practical purposes, be insoluble in the liquid vehicle at normal temperatures, but at the elevated temperatures of use of the composition the ethyl cellulose should partly dissolve in the liquid vehicle. Other ethers, such as methyl and benzyl cellulose, are not suitable.

The liquid vehicle may be any conventional drying or semi-drying oil or an alkyd resin modified with such an oil. It is also essential that the liquid vehicle contain no volatile matter since more than 0.3 per cent volatile matter in the film will produce swelling and blistering on baking. The vehicle viscosity usually lies between 9 and 17 poises.

The pigment combination, for best results, should preferably contain a preponderance of low oil absorption pigments so as to achieve as high a pigment to binder ratio as is consistent with suitable working properties.

The following example represents a typical composition. This example is given merely to illustrate certain embodiments of the invention and it is to be understood that the invention is not limited thereto.

EXAMPLE I

White putty

| | Parts by weight |
|---|---|
| 62% soya bean oil modified glyceryl phthalate | 13.0 |
| Ethyl cellulose (48.5–49.5% ethoxy, 7 cps.) | 7.0 |
| Lithopone | 7.0 |
| Barytes | 73.0 |
| | 100.0 |

The coating composition set forth above, as well as other coating compositions falling within the scope of the present invention, are prepared by mixing the pigments and the ethyl cellulose with the liquid vehicle and grinding in a heavy duty mixer or putty chaser, if necessary.

Where desired, other extenders or prime pigments may be incorporated in the coating composition falling within the scope of the present invention.

By the term "oil modified alkyd resin," as used herein, I mean the resinous condensation product resulting from the reaction of one or more polyhydric alcohols with one or more dibasic acids and one or more of the following modifying ingredients: drying oils, semi-drying oils, synthetic drying oils, and monobasic acids, especially those derived from drying oils, synthetic drying oils, synthetic drying oil acids and mixtures of one or more of these modifying ingredients with natural resin, as well as other equivalent products. While the invention is illustrated by soya bean oil modified alkyds, other oil modified alkyds may replace the one shown in the examples. The composition and method of preparation of the oil modified alkyd resin given in the above example may be carried out in any known manner as is well understood at the present stage of the art by those skilled in making such resins.

EXAMPLE II

| | Parts by weight |
|---|---|
| 73% linseed oil modified glyceryl phthalate | 11.8 |
| Ethyl cellulose (46.8–48.5% ethoxy, 14 cps.) | 6.9 |
| Dehydrated castor oil | 3.7 |
| Lithopone | 7.9 |
| Talc | 9.8 |
| Barytes | 55.0 |
| Gilder's whiting | 4.9 |
| | 100.0 |

EXAMPLE III

| | Parts by weight |
|---|---|
| 62% soya bean oil modified glyceryl phthalate | 12.0 |
| Ethyl cellulose (46.8–48.5% ethoxy, 100 cps.) | 7.0 |
| Heat bodied linseed oil | 1.0 |
| Lithopone | 8.0 |
| Barytes | 72.0 |
| | 100.0 |

EXAMPLE IV

| | Parts by weight |
|---|---|
| 62% soya bean oil modified glyceryl phthalate | 13.5 |
| Ethyl cellulose (46.8–48.5% ethoxy, 14 cps.) | 6.1 |
| Titanium dioxide | 18.1 |
| Barytes | 62.3 |
| | 100.0 |

The following is an example using alkyd resin, ethyl cellulose and colored pigment:

EXAMPLE V

| | Parts by weight |
|---|---|
| 62% soya bean oil modified glyceryl phthalate | 13.2 |
| Ethyl cellulose (46.8–48.5% ethoxy, 14 cps.) | 6.4 |
| Spanish oxide (red iron oxide, 78%) | 13.5 |
| Barytes | 66.9 |
| | 100.0 |

Following are two examples of drying oil vehicles without an alkyd resin:

EXAMPLE VI

| | Parts by weight |
|---|---|
| Heat bodied linseed oil (body U Gardner-Holdt scale) | 11.0 |
| Lithopone | 9.0 |
| Barytes | 73.0 |
| Ethyl cellulose (46.8–48.5% ethoxy) | 7.0 |
| | 100.0 |

EXAMPLE VII

| | Parts by weight |
|---|---|
| Heat bodied soya bean oil (body N Gardner-Holdt scale) | 12.2 |
| Ethyl cellulose (46.8–48.5% ethoxy, 14 cps.) | 8.1 |
| Lithopone | 8.0 |
| Barytes | 71.7 |
| | 100.0 |

Satisfactory putties with oils, such oils as Chinawood, Perilla, dehydrated castor, etc., commonly used in our industry give acceptable putties when used according to the present invention.

Examples illustrating compositions suitable for use with the putty, using mixtures of resins, are:

EXAMPLE VIII

| | Parts by weight |
|---|---|
| Titanium dioxide | 21.3 |
| Zinc oxide | 1.4 |
| 43% soya bean oil modified glyceryl phthalate | 4.5 |
| 43% dehydrated castor oil modified glyceryl phthalate | 17.1 |
| Urea - formaldehyde - monohydric alcohol resin | 16.2 |
| Petroleum naphtha | 8.2 |
| Butyl alcohol | 14.2 |
| Xylol | 17.1 |
| | 100.0 |

A film of 1.0–1.2 mils in thickness is applied after which the material is baked 30 minutes at 300° F.

Example IX

| | Parts by weight |
|---|---|
| 52% linseed oil modified glyceryl phthalate | 9.0 |
| 40% linseed oil modified glyceryl phthalate | 17.0 |
| 46% linseed oil-2/China-wood oil-1 modified glyceryl phthalate | .7 |
| 6-gallon China-wood oil modified Bakelite resin | .1 |
| Iron oxide (66%) | 1.4 |
| Ferrite yellow (iron oxide, 82%) | 2.7 |
| Bone black | 3.8 |
| Titanium dioxide | 1.3 |
| Antimony oxide | 17.9 |
| Diatomaceous earth | 1.1 |
| Silica | 1.1 |
| Cresylic acid | .1 |
| Manganese naphthenate | .1 |
| Petroleum naphtha | 43.7 |
| | 100.0 |

A film of 1.0–1.2 mils in thickness is applied after which the material is baked 1 hour at 275° F.

Another satisfactory putty may be made according to the following formula:

Example X

| | Parts by weight |
|---|---|
| 70% Perilla oil modified glyceryl phthalate | 10.0 |
| Ethyl cellulose (46.8–48.5% ethoxy, 14 cps.) | 6.6 |
| Lithopone | 14.0 |
| Barytes | 69.4 |
| | 100.0 |

The following is an example of a mixed oil and alkyd resin vehicle. In this case a much shorter oil modified alkyd was used than in any of the above examples. The total oil length of the vehicle, however, was still comparatively high—74%.

Example XI

| | Parts by weight |
|---|---|
| 15% castor oil modified glyceryl phthalate | 8.4 |
| Heat bodied soya bean oil (body N Gardner-Holdt scale) | 19.1 |
| Ethyl cellulose (46.8–48.5% ethoxy, 14 cps.) | 6.0 |
| Lithopone | 6.7 |
| Barytes | 58.8 |
| | 100.0 |

Vehicles of the drying oil type, as shown in Examples VI and VII, with or without a natural or synthetic resin, may be used and in some cases may be substituted for the oil modified alkyd resin utilized in Example I, but for the best results I have found that alkyd resins of the type given in the above examples are to be preferred but it is to be understood that other conventional alkyd resins as are not precluded will be apparent to those skilled in the art.

Pigments, other than those shown which could be substituted for these pigments, might be zinc oxide, antimony oxide, white lead, extended titanium oxides, etc. Or if colored putties are desired, any of the commonly used colored pigments could be substituted for the white prime pigments. These could comprise any of various metal oxides or hydroxides, chromates, cyanides, sulfides, phosphates, phthalocyanines, selenides, molybdates, etc., or even organic coloring materials. Similarly, extender pigments, such as blanc fixe, silica, China clay, powdered slate, asbestine, whiting, etc., could be substituted for all or part of the extenders given in my examples without affecting the basic principle of this invention.

By incorporating solid granular ethyl cellulose into a coating composition in which the ethyl cellulose is, for all practical purposes, insoluble at normal temperatures, it is possible to utilize a finishing system in which a baking topcoat may be applied almost immediately over a freshly applied surfacing coat and the two baked together to obtain a hard finish, with little or no deformation of the surfacing coat, with little or no discoloration of the topcoat, depending upon the nature of the liquid vehicle use, and with little or no diminution of gloss or topcoat.

The topcoat may be either lacquer or enamel type. However, there is no particular advantage in the use of this type of putty if lacquer topcoat is used. The advantage of lacquer topcoats is that baking equipment is not required. However, baking is required for the putty to fuse the ethyl cellulose and harden the alkyd portion of the vehicle. The particular advantage of this type putty is with baking topcoats so that baking of the putty and of the topcoat can be accomplished at one time. Examples of baking enamels are those containing oleoresinous or resinous vehicles. Various modified alkyd resins, urea formaldehyde resins, phenolic resins and mixtures thereof are suitable for use in the baking surface enamel.

The practice of this invention makes possible the elimination of time and labor consuming operations in the process of coating rough surfaces. Thus it is possible to eliminate the separate dry or bake of the glaze or putty, the necessity of sanding such glaze or putty, the need for applying a surfacer or a sealer coat, and the necessity of separate drying or baking of such surfacer or sealer coat. Another advantage is that a baking topcoat may be applied directly over the freshly applied surfacing composition and the two may be baked together to yield a hard finish with little or no deformation of the surfacing composition, with little or no discoloration of the topcoat, depending, of course, upon the nature of the liquid vehicle employed, and with little or no diminution of gloss of the topcoat. In the latter instance it should be noted that ordinary putties generally cause a dulling of the gloss of the topcoat applied directly over them. The absence of such dulling action by the ethyl cellulose surfacing compositions described herein constitutes a distinguishing characteristic.

The putty is particularly well adapted to filling seams. Satisfactory results have been obtained in filling seams $\tfrac{1}{16}$ inch wide and $\tfrac{3}{8}$ inch deep.

A low acid number of about 4 or 5 is preferred in the case of alkyd resins and a number of 7 to 10 in the case of drying oils.

It is apparent that many widely different embodiments of this invention may be made without departing from the spirit and scope thereof, and therefore, it is not intended to be limited except as indicated in the appended claims.

I claim:

1. A surfacing composition containing from 6 to 10% of solid granular ethyl cellulose having an ethoxy content between 46.8 and 48.5 per cent dispersed in a liquid vehicle containing material selected from the group consisting of drying vegetable oils, semi-drying vegetable oils, and alkyd resins modified with such oils in which the said ethyl cellulose is substantialy insoluble at normal temperatures, said vehicle containing less than 0.3 per cent of volatile components, and dispersed therein about 80% of combined pigment and filler.

2. A putty comprising from 6 to 10% of solid granular finely divided ethyl cellulose having an ethoxy content between 46.8 and 48.5 per cent dispersed in a liquid vehicle containing a drying oil modified alkyd resin having a volatile content below 0.3 per cent, and about 80% of combined pigment and filler.

3. The composition of claim 1 in which the vehicle contains a fatty oil having drying properties.

4. A surfacing composition having substantially the following composition:

| | Parts by weight |
|---|---|
| 62% soya bean oil modified glyceryl phthalate | 13.0 |
| Ethyl cellulose (48.5–49.5% ethoxy, 7 cps.) | 7.0 |
| Lithopone | 7.0 |
| Barytes | 73.0 |
| | 100.0 |

5. The composition of claim 1 in which the vehicle contains an alkyd resin modified with a fatty oil having drying properties with an acid number between 4 and 10 and a vehicle viscosity between 9 and 17 poises.

JOHN J. ZOLAD.